Nov. 22, 1966   R. S. JAY   3,286,542
POWER OPERATED PLATFORM
Original Filed Aug. 13, 1963   3 Sheets-Sheet 1
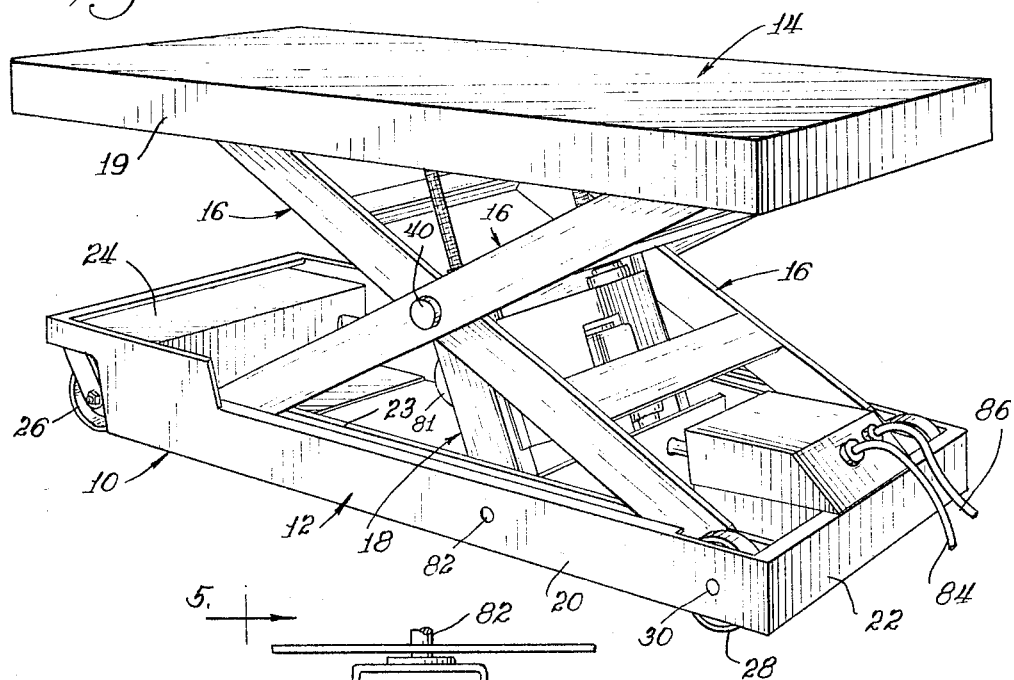
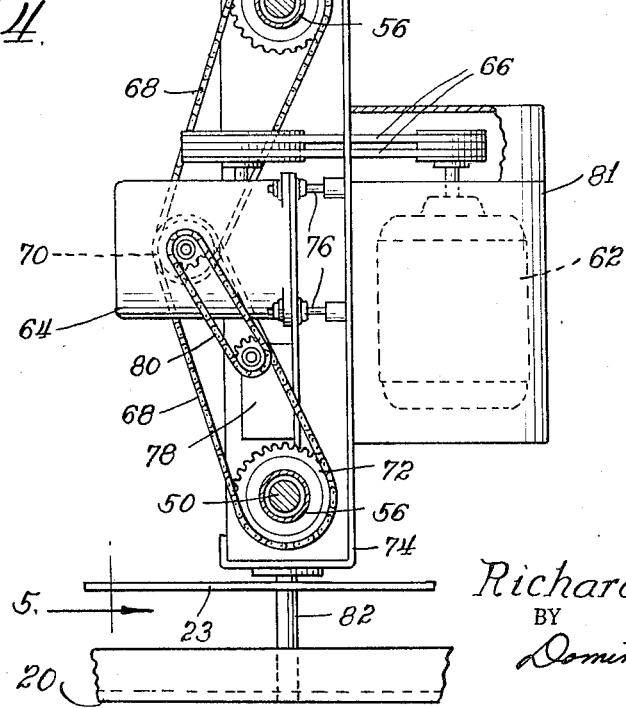
INVENTOR.
Richard S. Jay
BY
Dominik and Stein
att'ys.

Nov. 22, 1966  R. S. JAY  3,286,542
POWER OPERATED PLATFORM
Original Filed Aug. 13, 1963  3 Sheets-Sheet 2
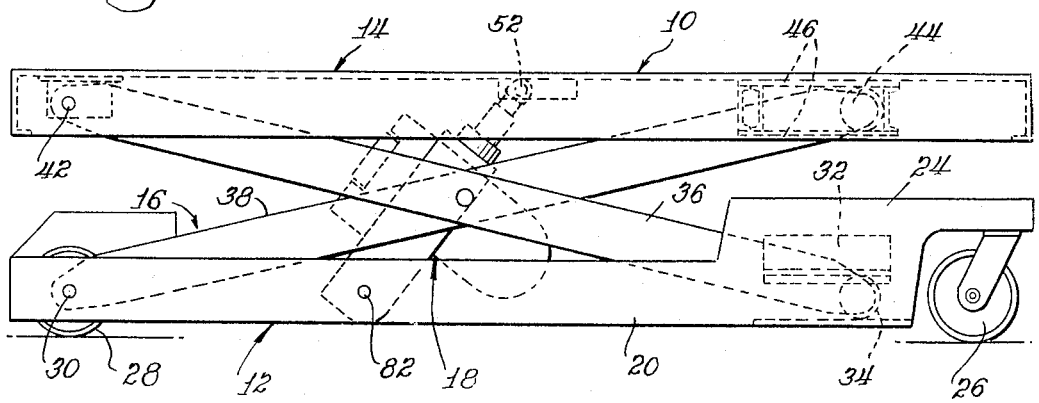
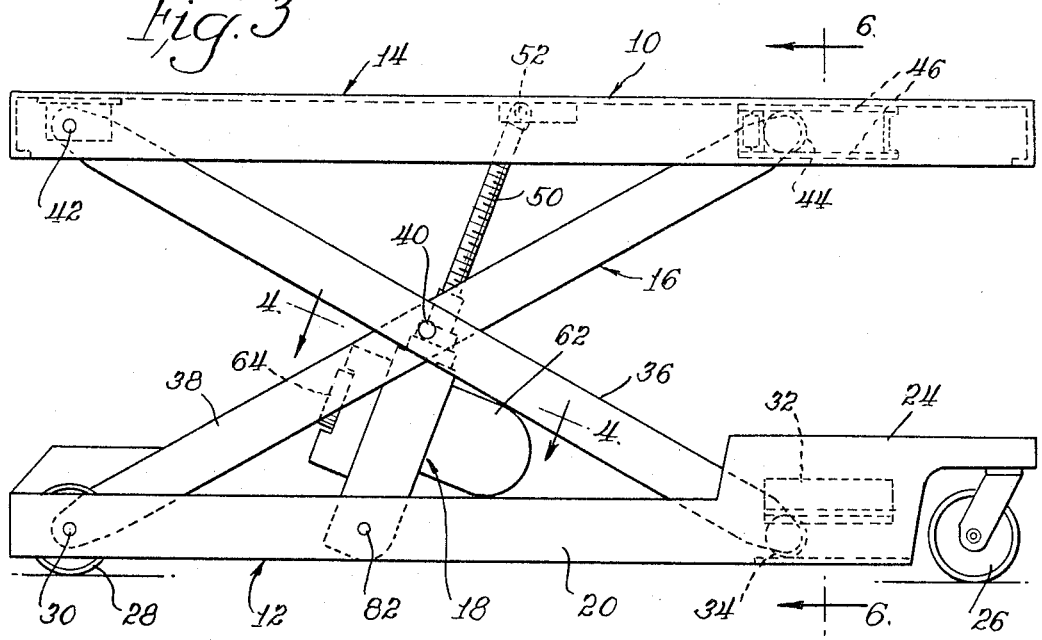
INVENTOR.
Richard S. Jay
BY
Dominik and Stein
Att'ys

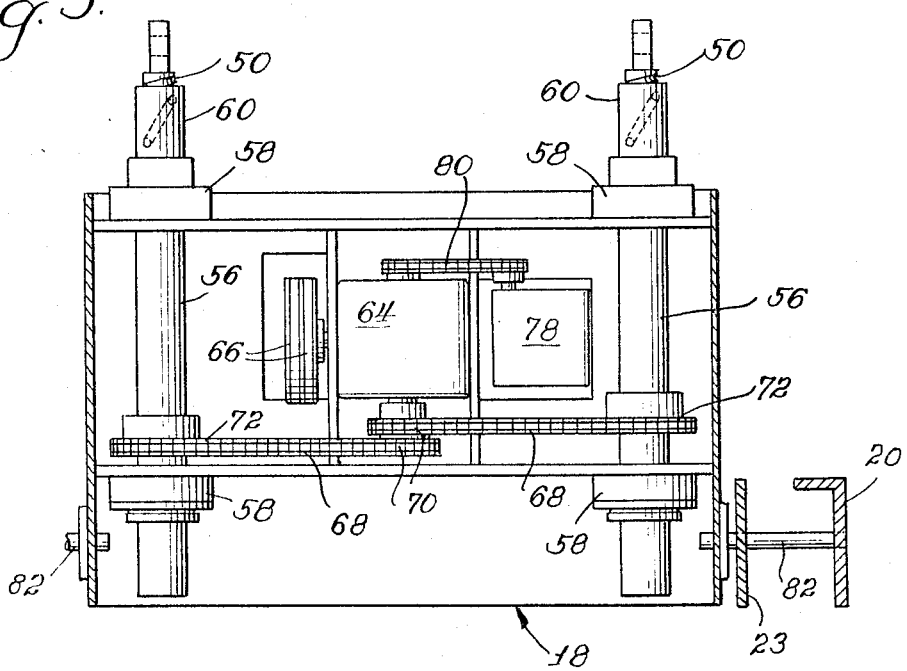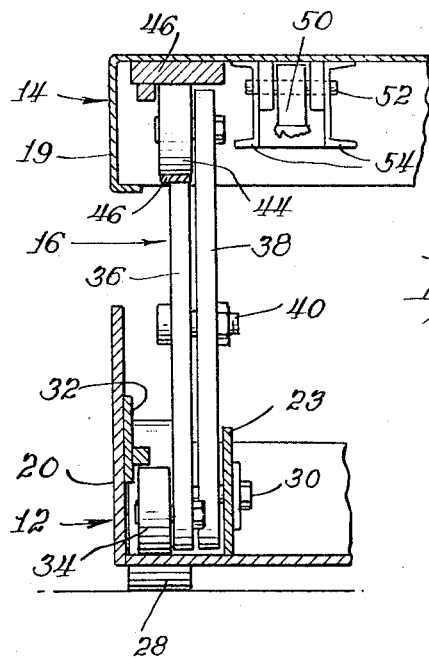

United States Patent Office 3,286,542
Patented Nov. 22, 1966

3,286,542
POWER OPERATED PLATFORM
Richard S. Jay, Evanston, Ill., assignor to Jarke Corporation, Chicago, Ill., a corporation of Illinois
Original application Aug. 13, 1963, Ser. No. 301,792, now Patent No. 3,237,921, dated Mar. 1, 1966. Divided and this application July 26, 1965, Ser. No. 485,665
6 Claims. (Cl. 74—424.8)

This application is a divisional application of application Serial No. 301,792 filed August 13, 1963, now Patent No. 3,237,921.

This invention relates to an improvement in power operated platforms, and more particularly, to the type providing heavy duty service.

Similar power operated platforms of the past have strongly relied upon hydraulic power for platform operation. An outstanding disadvantage of such apparatus is the fact that upon rupture of the hydraulic circuit, as by a bursting hose, the platform would suddenly drop, resulting in possible serious injury to personnel, or damage to property. Also, leakage in the hydraulic circuit would cause drifting in level control. Not only is such leakage detrimental to the satisfactory operation of the apparatus, but it provides a source of nuisance because of the unslightly appearance of the apparatus, and more importantly, the danger resulting from oil slicks on the floors where the apparatus is being used.

The power operated platform of the present invention is a completely mechanical, power operated apparatus, wherein the certain disadvantages associated with equivalent apparatus, as above discussed, are eliminated. Furthermore, the electric motor means used in the apparatus of the present invention, is of the self braking type so that when power is disrupted as by switch action, or power failure, the mechanical brake means will automatically lock the motor, and parts driven thereby, against further movement. As a result, positive no-drift level control is achieved at all times, and under any conditions.

In prior art, mechanical driven platforms, i.e., wherein hydraulic power was not utilized for platform operation, many variations in design were, of course, proposed and utilized with varying degrees of success. Generally, in such apparatus, power for platform operation was applied to the platform moving arms. This necessitated arms of greater strength to accommodate not only static loads, but dynamic loads as well. Accordingly, the arms had to be made heavier, which resulted in greater fabrication cost, as well as greater horsepower in the motive means as required to handle the additional weight.

The power operated platform of the present invention incorporates a unitized power means which is pivotally arranged between a base and the movable platform of the apparatus. Consequently, dynamic loading is substantially absorbed by the power means, while static loading is divided between the power means as well as the platform. Accordingly, the platform operating arms may be of lighter weight than utilized in comparable prior art apparatus, as discussed above, resulting in reduced cost of construction and lower horsepower requirements without any sacrifice being made in ruggedness or operational efficiency. The unitized power means incorporates balanced twin ball screws, coupled with a simple motor-reducer-chain transmission which achieves smooth, high efficiency power output with no creep, drift or sponginess.

The main object of this invention is to provide an improvement in power operated platforms and more particularly of the type providing heavy duty service.

A more specific object is to provide a power operated platform which is charcterized by no-drift level control.

Another specific object is to provide a power operated platform which maintains platform level under all operational conditions, including power failure.

A further object is to provide a power operated platform of lighter weight and lower horsepower requirements, as compared with generally similar power operated platforms of the prior art.

Still another object is to provide a power operated platform which avoids disadvantages associated with hydraulically operated platforms, such as loss of operating fluid.

A further object is to provide a power operated platform incorporating a unitized power means characterized by smooth, high efficiency power output with no creep, drift or sponginess.

These and further objects and features of the invention will become more apparent from the following description and accompanying drawings wherein;

FIG. 1 is a perspective-like illustration of a power operated platform embodying the principles of the invention;

FIG. 2 is a side elevation of the same showing the platform in lowered position;

FIG. 3 is the same but showing the platform in elevated position;

FIG. 4 is an enlarged view generally as seen along line 4—4 in FIG. 3;

FIG. 5 is a view generally as seen along line 5—5 in FIG. 4; and

FIG. 6 is a view generally as seen along line 6—6 in FIG. 3.

Referring now to the drawings, numeral 10 identifies a power operated platform made in accordance with the principles of the invention, which includes a base 12, a platform 14, two sets of crossed arms 16 arranged in scissor-like manner, and a pivotally mounted extensible means 18 arranged for raising and lowering the platform 14. A downwardly extending skirt 19 may be provided about the periphery of the platform.

The base 12 is of rectangular shape of the same overall dimension as the platform, and is formed of outer side pieces 20 maintained in spaced parallel relation by end pieces 22. An inner side piece 23 is arranged in parallel spaced relation to each outer side piece 20 to provide a channel for partial receipt of the sets of crossed arms when the platform is in lowered position, as in FIG. 2. An elevated platform, or deck, 24 is formed toward one end of the base 12, which platform has a pair of swivel casters 26, and a floor lock (not shown) affixed to the underside, while at the other end of the base, a pair of wheels 28 are mounted upon axles 30 supported in the side pieces 20. The casters 26 and wheels 28 are positioned to maintain the base parallel with a flat floor surface, as best seen in FIGS. 2 or 3. A retainer plate 32, secured to the inside of each outer side piece 20, is adapted to form an upper bearing surface for a roller 34, affixed to an end of an arm 36 of the crossed arms 16. A second arm 38 of the crossed arms 16 is pivoted upon the axle 30 at the other end of the base. Both arms 36 and 38 are pivotally interconnected at midpoint by a pin or bolt 40.

The upper end of each arm 36 is pivoted to the underside of the platform 14 by a pin, or bolt 42, while the upper end of each arm 38 is affixed to a roller 44, which is constrained for horizontal movement within a retainer plate 46. It will be seen that the crossed arms 16 will serve to maintain the platform 14 parallel to the base 12 as the platform is moved toward or away from the base.

The extensible means 18 includes a pair of ball screws 50, each of which is pivotally affixed at the upper end to a pin 52 supported by channel members 54 secured to the underside of the platform 14. The ball screws 50 are each arranged within a torque tube 56 mounted for rotation in laterally disposed radial-thrust bearings 58. The upper end of each torque tube 56 is affixed to a ball nut 60 which has a plurality of balls arranged for engaging a ball screw thread of the screw 50, whereby rotation of the ball nut 60 will cause longitudinal movement of the ball screw, in a well known manner.

The torque tubes 56 are each rotated by a motor 62 operating through a right angle gear reducer 64. The motor is of the automatic braking type, that is, automatic means lock the motor against rotation when the current is cut off to the motor, either intentionally or otherwise. A belt drive 66 interconnects the motor and the gear reducer, while drive chains 68 interconnect the gear reducer and torque tubes, such connection being made through sprockets 70 and 72, respectively. As best seen in FIG. 4, the gear reducer 64 is mounted to a frame means 74 by way of adjusting screws, or studs, 76, whereby the drive chains 68 may be tensionally adjusted. Similar means (not shown) are arranged for moving the motor relative to its support upon the frame means whereby the drive belts 66 may be tensionally adjusted. A rotary limit switch 78 is provided, which is driven by a chain 80 operatively connected to the gear reducer 65. The switch 78 which is set to operate after a given number of revolutions in either direction is in the electrical circuit of the motor 62. In such manner, the extent of platform movement, up or down, may be conveniently controlled. A housing 81 may be placed about the motor as shown.

The extensible means 18 forms a unitary assemblage which provides platform movement as desired in a given lifting or lowering operation. The lower end of the extensible means 18 is connected to the base 12 by a shaft or pin means 82, the overall arrangement being as shown in FIGS. 1 to 3. A power input cord 84 is provided for connecting the motor to a suitable electrical source, and a control cord 86 having a foot switch (not shown) may be tied in the electrical circuit for remote control of platform movement.

Operation of the power operated platform 10 should, of course, be fairly obvious. It will be noted that the disclosed apparatus will satisfy all of the objectives set forth hereinbefore.

The foregoing description has been given in detail without thought of limitation, since the inventive principles involved are capable of assuming other forms without departing from the spirit of the invention or the scope of the following claims.

What is claimed is:

1. An extensible means for use on a power operated platform having a base and a platform including in combination, frame means pivotally secured at one end to said base, a ball screw nut positionably affixed to said frame means, motor means affixed to said frame means and coupled to said ball screw nut for rotating it, a ball screw shaft having one end pivotally secured to said platform and its other end threadedly retained within said ball screw nut for axial movement upon rotation of said ball screw nut, whereby axial movement of said ball screw shaft exerts a force directly upon said platform to cause movement of said platform.

2. An extensible means for use on a power operated platform having a base and a platform including in combination, frame means pivotally secured at one end to said base, a pair of ball screw nuts positionally affixed to said frame means, motor means affixed to said frame means, a power transmission affixed to said frame means and interconnecting said motor means and each of said ball screw nuts for causing simultaneous rotation of said ball screw nuts, a pair of ball screw shafts each having one end pivotally affixed to said platform and its other end threadedly retained within an associated one of said pair of ball screw nuts for axial movement upon rotation of said ball screw nut, whereby axial movement of said ball screw shafts exert a force directly upon said platform to cause movement of said platform.

3. An extensible means for use on a power operated platform according to claim 2, wherein said power transmission means includes a drive chain, and a sprocket arranged for driving the shaft nut, said sprocket being operatively engaged by said chain.

4. An extensible means for use on a power operated platform according to claim 2, wherein said power transmission means comprises a pair of sprockets mounted in spaced parallel relation upon a drive shaft of the motor means, a sprocket arranged for driving each shaft nut, a drive chain interconnecting the sprocket driving a first shaft nut to one of the motor shaft sprockets, and a drive chain interconnecting the sprocket driving the second shaft nut to the other motor shaft sprocket.

5. An extensible means for use on a power operated platform according to claim 2, wherein a rotary operated limit switch is arranged to control operation of the motor means, said limit switch being supported in the frame means and being operatively connected to a drive shaft of the motor means.

6. An extensible means for use on a power operated platform according to claim 2, wherein operation of said motor means is controlled by a remotely positional switch means.

References Cited by the Examiner
UNITED STATES PATENTS

| | | | |
|---|---|---|---|
| 2,802,549 | 8/1957 | De los Santos et al. | 74—424.8 X |
| 2,918,827 | 12/1959 | Brown | 74—424.8 |
| 3,043,410 | 7/1962 | Pearson | 74—424.8 X |
| 3,142,998 | 8/1964 | Pickles | 74—424.8 |
| 3,212,747 | 10/1965 | Hansen et al. | 74—424.8 X |

DAVID J. WILLIAMOWSKY, *Primary Examiner.*

LEONARD H. GERIN, *Assistant Examiner.*